United States Patent [19]

Skeels et al.

[11] Patent Number: 5,248,491
[45] Date of Patent: Sep. 28, 1993

[54] ZEOLITE LZ-276 AND PROCESS FOR PREPARING SAME

[75] Inventors: Gary W. Skeels, Brewster; Marilyn R. Sears, Ossining, both of N.Y.

[73] Assignee: UOP, Des Plaines, Ill.

[21] Appl. No.: 812,510

[22] Filed: Dec. 20, 1991

[51] Int. Cl.$^5$ .............................................. C01B 33/34
[52] U.S. Cl. ..................................... 423/705; 423/718
[58] Field of Search .............. 423/326, 328, 329, 330, 423/705, 718; 502/60, 64, 77

[56] References Cited

U.S. PATENT DOCUMENTS 4,124,686  0/1978  Grose et al. .......................... 423/328

OTHER PUBLICATIONS

"Synthesis and Characterization of Zeolite Phi", Franco et al., Zeolites, 1991, vol. 11, Apr./May, pp. 349-355.

Literature Article in Zeolites, 1986, vol. 6, Sep. pp. 334, 335 and last page, by Marten & Jacobs.

"Shiyou Huagong (Pet. Chem. Eng.)" vol. 19, No. 3, pp. 148-152 1990 by H. Y. Li et al. English language translation provided.

"Stud. Surf. Sci. Catal.", 1987 vol. 33, at pp. 15, 26, 35, 41, 358 and 363-364; P. A. Jacobs et al.

*Primary Examiner*—R. Bruce Breneman
*Attorney, Agent, or Firm*—Thomas K. McBride; Richard G. Miller

[57] ABSTRACT

A novel aluminosilicate zeolite molecular sieve, denominated LZ-276, having effective pore diameters in the small to medium size range and possibly being topologically related to zeolite Phi, is synthesized hydrothermally in the TEAOH-$Na_2O$-$SiO_2$-$Al_2O_3$-$H_2O$ system at a temperature of from 100° C. to 150° C.

5 Claims, No Drawings

ZEOLITE LZ-276 AND PROCESS FOR PREPARING SAME

FIELD OF THE INVENTION

The present invention relates in general to zeolitic molecular sieves and more particularly to a novel zeolite, denominated LZ-276, which has pores capable of adsorbing n-butane but incapable of adsorbing i-butane and $SF_6$, and which may be topologically related to zeolite Phi. LZ-276 is synthesized hydrothermally at a temperature of 100° C. to 150° C. from a reaction mixture containing the TEA+ cation as the templating agent but free of potassium cations.

BACKGROUND OF THE INVENTION

Zeolite Phi is defined and the method for its synthesis described in detail in U.S. Pat. No. 4,124,686, issued Nov. 7, 1978, to R. W. Grose et al. As disclosed therein, zeolite Phi is prepared hydrothermally from aqueous gels in the $[N(CH_3)_2O—Na_2O—Al_2O_3—SiO_2]$ system. As synthesized, the zeolite exhibits large pore adsorption characteristics, has a composition expressed in terms of molar oxide ratios as

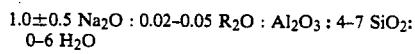

1.0±0.5 $Na_2O$ : 0.02–0.05 $R_2O$ : $Al_2O_3$ : 4–7 $SiO_2$: 0–6 $H_2O$ wherein "R" represents the tetramethylammonium ion, and has a characteristic x-ray powder diffraction pattern containing at least the d-spacings shown in Table A below.

TABLE A

| Interplanar Spacing d,A | Relative Intensity |
|---|---|
| 11.6 ± 0.2 | M |
| 9.5 ± 0.2 | S |
| 7.00 ± 0.15 | S |
| 5.61 ± 0.10 | S |
| 5.04 ± 0.08 | S |
| 4.31 ± 0.08 | S |
| 3.43 ± 0.06 | VS |
| 2.92 ± 0.05 | VS |
| 2.61 ± 0.05 | W |
| 2.09 ± 0.05 | W |

In the expression of the relative intensity values, VS=very strong, S=strong, M=medium and W=weak. Evidence supporting the large-pore status of zeolite Phi includes adsorption data for $(C_4F_9)_3N$ and neopentane, the latter being adsorbed on a calcined template-free zeolite Phi in an amount of 3.5 weight percent at a temperature of 25° C. and a pressure of 750 torr. These data can be interpreted to mean that zeolite Phi contains 12-membered oxygen rings, a proposition further supported by data reported by Martens and Jacobs (ZEOLITES, 1986, vol. 6, September) derived from the bifunctional conversion of n-decane using Pt-loaded hydrogen forms of zeolite Phi. It is observed that in the x-ray diffraction pattern of the zeolite a number of the diffraction lines are broadened, suggesting a high degree of disorder in certain crystallographic directions and making a detailed elucidation of the crystal structure impossible.

The synthesis and properties of zeolite Phi have been investigated on at least three other occasions, namely by P. A. Jacobs et al in 1987 (Stud. Surf. Sci. Catal. 1987, 33 at page 15 et seq.), H. Y. Li et al in 1990 as reported in Shiyou Huagong (Petroleum Chemical Engineering), vol. 19, No. 3, pgs. 148-152, and M. J. Franco et al in 1990, published in ZEOLITES, 1991, Vol. 11, April/May, pgs. 349-355. In the Jacobs et al study, it was reported that a zeolite Phi composition was prepared in an attempt to synthesize zeolite ZSM-20 using tetraethylammonium hydroxide (TEAOH) as the templating agent and a gel having the following composition:

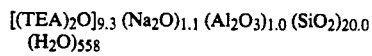

$[(TEA)_2O]_{9.3}$ $(Na_2O)_{1.1}$ $(Al_2O_3)_{1.0}$ $(SiO_2)_{20.0}$ $(H_2O)_{558}$

The silica reagent was hydrolyzed tetraethylorthosilicate from which the hydrolysis by-product ethanol was removed, and sodium aluminate was the source of alumina and a portion of the sodium. The remainder of the sodium was provided by NaOH. The gel was aged at 4° C. (277° K.) for 2 days and then autoclaved quiescently at 100° C. for 14 days. Only the framework infrared data for the actual Phi composition prepared by Jacobs et al is reported. Presumably, except for the presence of the TEA+ cations rather than TMA+ cations, the physical and chemical properties of the Jacobs et al composition were essentially the same as those reported in the same article for the zeolite Phi of Grose et al.

In the work reported by Franco et al, supra, the authors employed synthesis gels in the system

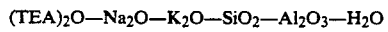

$(TEA)_2O—Na_2O—K_2O—SiO_2—Al_2O_3—H_2O$

The gels were prepared by the addition at room temperature of tetraethylorthosilicate (TEOS) to a stirred solution containing NaOH, $NaAlO_2$, NaCl, KCl and TEAOH. After hydrolysis of the TEOS, stirring was continued for several hours to evaporate the ethanol formed. The resulting gels were then crystallized under static conditions at 100° C. or 120° C. for periods of 8 to 13 days. Of the six products which were relatively free of extraneous crystalline phases such as gmelenite, offretite and gismondine, the $Si/Al_2$ ratios were within the range of 4.14 to 6.28. The $Si/Al_2$ ratio in each instance was a consequence of a combination of the relative proportion of $Na_2O$, $K_2O$ and TEAOH and the temperature at which the crystallization was carried out. With a total absence of potassium in the synthesis gel, an acceptable zeolite Phi composition was not produced, giving rise to the supposition by the investigators that in fact potassium was present in the Jacobs et al reaction mixture by virtue of being an appreciable impurity in the TEAOH reagent employed. The combined $K^+$ + $Na^+$ content of the TEAOH reagent employed by Franco et al was less than 20 ppm(w).

The x-ray powder diffraction pattern of the most crystalline zeolite Phi product of the Franco et al study is set forth in Table B, below. The radiation was $CuK_\alpha$.

TABLE B

| d(Å) | $I/I_o \times 100$ |
|---|---|
| 11.5 ± 0.3 | 5 |
| 9.3 ± 0.2 | 24 |
| 6.9 ± 0.1 | 15 |
| 5.53 ± 0.08 | 16 |
| 5.01 ± 0.06 | 27 |
| 4.31 ± 0.04 | 66 |
| 3.97 ± 0.04 | 9 |
| 3.86 ± 0.03 | 13 |
| 3.77 ± 0.03 | 4 |
| 3.58 ± 0.03 | 22 |
| 3.14 ± 0.03 | 24 |
| 3.23 ± 0.02 | 8 |
| 2.92 ± 0.02 | 100 |

TABLE B-continued

| d(Å) | I/I$_o$ × 100 |
|---|---|
| 2.69 ± 0.02 | 5 |
| 2.60 ± 0.01 | 25 |
| 2.50 ± 0.01 | 10 |
| 2.30 ± 0.01 | 7 |
| 2.08 ± 0.01 | 15 |

In general in the x-ray diffraction data appearing herein the relative intensity values reported in terms of numerical values of I/I$_0$×100 correspond to the commonly used expressions VS, S, W, etc., in the following manner:

| | |
|---|---|
| Very Strong (VS) = | 90–100 |
| Strong (S) = | 39–89 |
| Medium (M) = | 21–38 |
| Medium-Weak (MW) = | 13–20 |
| Weak (W) = | 1–12 |

In contrast to the zeolite Phi compositions of Grose et al and the products attributed to Jacobs et al, the Phi products of Franco et al had adsorption properties characteristic of small to medium pore zeolites rather than large pore zeolites. This difference was attributed to stacking faults in the crystalline lattice.

The investigation of Li et al involved primarily synthesis gels in the TMA$_2$O—Na$_2$O—Al$_2$O$_3$—SiO$_2$ system, although it is reported that zeolite Phi could be prepared using TEAOH, tetrabutylammonium hydroxide (TBAOH), propylamine or tripropylamine as the templating agent. In the experiments reported, attempts were made to determine the effects of a number of synthesis variables including changes in the TMAOH/SiO$_2$ ratio, the SiO$_2$/Al$_2$O$_3$ ratio, the Na$_2$O/SiO$_2$ ratio, the H$_2$O/SiO$_2$ ratio and the effects of different templating agents, and sources of Al$_2$O$_3$ and SiO$_2$. The correlations of the crystallization temperatures, at 120° C., 100° C. and 80° C., with the crystallization rates and incubation periods for zeolite Phi production were also examined, but no observations concerning the correlation of crystallization temperature with the Si/Al$_2$ ratio of the product zeolite were made. The Si/Al$_2$ ratio of the zeolite Phi products reported were within the range of 3.3 to 3.9 and exhibited large pore zeolite adsorption properties as evidenced by the adsorption of appreciable quantities of tri-n-propylamine. All of the zeolite Phi materials produced were said to have thermal stability too poor for practical applications.

SUMMARY OF THE INVENTION

It has now been discovered that a novel zeolitic aluminosilicate, LZ-276, having at least some structural similarity to zeolite Phi, can be synthesized hydrothermally in the TEAOH—SiO$_2$—Al$_2$O$_3$—Na$_2$O—H$_2$O system at a temperature in the range of 100° C. to 150° C., preferably in the range of 125° C. to 150° C. The assynthesized forms of LZ-276 are free of potassium and contain both sodium and tetraethylammonium cations as charge-balancing ions in association with framework AlO$_2$ tetrahedra, and have framework Si/Al$_2$ ratios in the range of 3.5 to 15. Zeolites of a particularly preferred subclass of LZ-276 have framework Si/Al$_2$ ratios of greater than 7.0, and preferably greater than 7.5, prior to extraction of any framework aluminum atoms. The novel zeolite has a characteristic x-ray powder diffraction pattern as initially set forth below in Table C.

TABLE C

| d,Å | Relative Intensity |
|---|---|
| 11.6 ± 0.5 | M (Broad)* |
| 9.30 ± 0.2 | S (Broad) |
| 6.86 ± 0.1 | S (Sharp)* |
| 5.54 ± 0.1 | M (Broad) |
| 5.01 ± 0.1 | S (Sharp) |
| 4.29 ± 0.1 | VS (Broad) |
| 3.96 ± 0.1 | M (Sharp) |
| 3.56 ± 0.05 | M (Broad) |
| 3.43 ± 0.05 | S (Sharp) |
| 2.91 ± 0.05 | S (Broad) |
| 2.59 ± 0.05 | M (Sharp) |
| 2.28 ± 0.05 | W |
| 2.12 ± 0.05 | W |
| 2.08 ±]0.05 | W |
| 1.90 ± 0.05 | W |
| 1.80 ± 0.05 | W |
| 1.71 ± 0.05 | W |
| 1.69 ± 0.05 | W |
| 1.67 ± 0.05 | W |

*The terms (Broad) and (Sharp) refer to the character of the d-spacing peaks as they appear on the strip chart.

In the as-synthesized form zeolite LZ-276 has a chemical composition expressed in terms of molar oxide ratios in the anhydrous state as:

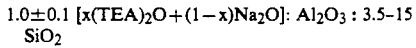

wherein "x" has a value of between about 0.1 and 0.5. The zeolite is also characterized by having, in an "activated state," an adsorptive capacity for SF$_6$ at 25° C. and 400 torr pressure of less than 0.1 weight percent and an oxygen capacity at −183° C. and 100 torr of at least 17 weight percent. By activated state is meant the condition in which the organic moieties and water molecules present in the internal cavities of the crystal structure as a result of the synthesis procedure have been removed, ordinarily by calcination in air at a temperature of at least 450° C.

DETAILED DESCRIPTION OF THE INVENTION

Zeolite LZ-276 can be prepared hydrothermally by crystallization from a reaction mixture whose composition expressed in terms of mole ratios of oxides falls within the following ranges:

| | Broad | Preferred |
|---|---|---|
| Na$_2$O/SiO$_2$ | 0.03–0.25 | 0.03–0.15 |
| SiO$_2$/Al$_2$O$_3$ | 4–35 | 10–20 |
| H$_2$O/Na$_2$O | 120–450 | 200–425 |
| (TEA)$_2$O/SiO$_2$ | 0.2–2.0 | 0.3–1.0 |

In forming the aqueous reaction mixtures from which crystals of LZ-276 are formed, the conventional reactants used in the synthesis of other zeolites from the (TEA)$_2$O—Na$_2$O—Al$_2$O$_3$—SiO$_2$—H$_2$O system are suitably employed. Alumina can be provided by activated alumina, alpha alumina, gamma alumina, alumina trihydrate, aluminum hydroxide or sodium aluminate. Sodium hydroxide can supply a portion or all of the sodium cations required. Silica sols, sodium silicates or solid reactive amorphous silicas can serve as the source of silica for the reaction mixtures. The solid amorphous silicas include chemically-precipitated silicas, fume silicas, arc silicas and siliceous materials derived from acid extracted zeolite minerals. The (TEA)$_2$O source is preferably TEAOH, although at least some portion of the TEAOH requirements can be provided by TEABr, particularly in those instances in which the Na$_2$O contact of the reaction mixture is relatively high.

Advantageously the crystallization procedure is carried out at a temperature in the range of about 100° C. to 150° C., preferably in the range of 125° C. to 150° C. The pressure conditions are not narrowly critical, and are ordinarily established autogenously within the sealed reactor containing the reaction mixture at the particular digestion and crystallization temperature chosen. Any suitable heating apparatus, e.g., an oven, sand bath, oil bath or jacketed autoclave, can be used. Heating is continued until the crystals of zeolite LZ-276 are formed, usually for a period of from 2 to 5 days, but in some instances as long as 25 days or more. The product crystals are then recovered, as by filtration or centrifugation, and washed with water to remove at least the bulk of the mother liquor, usually until the pH value of the wash water is less than about 10.

Although the crystal structure of zeolite LZ-276 has not been fully elucidated, the x-ray diffraction pattern of the zeolite establishes that there is probably a topological relationship with the various zeolite Phi compositions produced using organic templating agents. It also appears that, like the zeolite Phi synthesized by Franco et al, supra. using TEAOH as the templating material, LZ-276 is substantially pore blocked by virtue of having stacking faults in its crystal lattice. Whatever the reason, the effective nominal pore diameters of LZ-276 are in the range of about 4.3 to 5.0 Angstroms. Thus, LZ-276 is effectively a small-pore zeolite composition as evidenced by the fact that it will adsorb less than 0.1 weight percent SF$_6$. While the SF$_6$ molecule is too large to enter the internal pore system of the zeolite, a small fraction of the adsorption capacity of the zeolite is satisfied by adsorption on the outer surface of the crystal without the necessity of being able to enter the pore system. Assuming a crystal surface area of 10 m$^2$/g., for example, the SF$_6$ packing could theoretically account for about 0.08 wt. % adsorbed SF$_6$.

The small-pore property of zeolite LZ-276 makes it a very useful catalyst base for the conversion of methanol to olefin products. A number of hydrocarbon conversion processes, e.g., olefin oligomerization and dewaxing, are also facilitated by zeolite pore sizes in the range effective in zeolite LZ-276.

EXAMPLE 1

(a) In the preparation of an LZ-276 material of the present invention the following procedure was followed: Using a separatory funnel, 307.2 grams of tetraethylorthosilicate were added over the period of 1.5 hours to 508.8 grams of a 40% aqueous solution of tetraethylammonium hydroxide (TEAOH). The temperature of the resultant solution was about 30° C. at the completion of the TEAOH addition, and was thereafter raised to 78°-80° C. by the application of external heat, and maintained at that temperature for 4.0 hours. This first solution was cooled to ambient room temperature. A second solution was prepared by dissolving 1.56 grams of NaOH in 432 ml. of deionized water and then adding and dissolving therein 15.6 grams (anhydrous basis) of sodium aluminate, NaAlO$_2$. After combining the first and second solutions to form the overall reaction mixture, the latter was aged at room temperature for 48 hours. The aged mixture was divided into ten portions of approximately 100 grams and each portion crystallized in a sealed reactor under the following conditions:

| Sample | Crystallization Time | Temp. | Wt. of Gel, (g.) | Wt. of Solid Prod., (g.) |
|---|---|---|---|---|
| (a) | 8 days | 100° C. | 104.0 | 3.91 |
| (b) | 12 days | " | 104.4 | 4.42 |
| (c) | 14 days | " | 105.8 | 4.20 |
| (d) | 18 days | " | 106.8 | 3.99 |
| (e) | 21 days | " | 101.8 | 4.28 |
| (f) | 1 day | 125° C. | 104.6 | 4.15 |
| (g) | 4 days | " | 117.3 | 5.66 |
| (h) | 8 days | " | 106.8 | 5.10 |
| (i) | 12 ays | " | 103.0 | 5.40 |
| (j) | 14 days | " | 105.3 | 5.62 |

After recovery of the solids product in each instance filtration, washing with distilled water and drying at ambient room temperature, two composite samples were formed by combining 3.66 grams of the product of sample (c), 3.41 grams of sample (d) and 3.91 grams of sample (e) in one case, and 4.22 grams of sample (h), 4.80 grams of sample (i) and 4.55 grams of sample (j) in the second case. These composites were each subjected to chemical analysis. The chemical compositions (anhydrous basis) of the composites, in terms of molar oxide ratios were:

Composite (A) 0.07 (TEA)$_2$O : 0.91 Na$_2$O : Al$_2$O$_3$ : 4.96 SiO$_2$

Composite (B) 0.25 (TEA)$_2$O : 0.73 Na$_2$O : Al$_2$O$_3$ : 7.67 SiO$_2$ (b) A portion of the sample composite (B) was heated in air in a Lindberg furnace in accordance with the following regimen using an air flow over the sample of 2 standard cubic feet per hour:
(i) 100°-350° C. over the period of 50 minutes
(ii) held at 350° for 1 hour
(iii) 350° C. to 400° C. in 25 minutes
(iv) held at 400° C. for 1 hour The calcined sample was allowed to cool in a desiccator, hydrated for 48 hours at 50% relative humidity at 25° C., and then subjected to x-ray analysis. The x-ray powder diffraction data is set forth in Table D, below.

TABLE D

| d,A | Relative Intensity (I/I$_o$ × 100) |
|---|---|
| 11.7 ± 0.5 | 14 (Broad) |
| 9.28 ± 0.2 | 69 (Broad) |
| 6.85 ± 0.1 | 100 (Sharp) |
| 5.51 ± 0.1 | 28 (Broad) |
| 4.98 ± 0.1 | 68 (Sharp) |
| 4.29 ± 0.1 | 96 (Broad) |
| 3.96 ± 0.1 | 14 (Sharp) |
| 3.58 ± 0.05 | 12 (Broad) |
| 3.42 ± 0.05 | 67 (Sharp) |
| 2.91 ± 0.05 | 86 (Broad |
| 2.59 ± 0.05 | 25 (Sharp) |
| 2.28 ± 0.05 | 7 |
| 2.11 ± 0.05 | 6 |
| 2.07 ± 0.05 | 16 |
| 1.90 ± 0.05 | 11 |
| 1.79 ± 0.05 | 18 |
| 1.71 ± 0.05 | 14 |

(c) Using another portion of the same starting LZ-276 sample used in the procedure of part (b) above, the thermal stability of the zeolite was tested by calcination in air at 500° C. and 600° C., respectively. The same apparatus and general procedure were employed using the following heating regimens:

For 500° C. calcination:
  (i) 100° C.–350° C. in 1 hour, hold at 350° C. for 1 hour
  (ii) 350° C.–400° C. in 25 minutes, hold at 400° C. for 1 hour
  (iii) 400° C.–500° C. in 1 hour, hold at 500° C. for 1 hour For 600° C. calcination: The same as for the 500° C. calcination except for the addition of a final stage of heating from 500° C. to 600° C. over the period of 1 hour followed by sustaining the 600° C. temperature for 1 hour.

The calcined samples in each case were cooled to ambient room temperature in a desiccator and then hydrated at 50% relative humidity at 25° C. for 48 hours. The x-ray diffraction spectra of the samples were obtained. Both showed a high retention of crystallinity. The spectrum for the 600° C. calcined sample was as follows:

TABLE E

| d,A | Relative Intensity ($I/I_o \times 100$) |
|---|---|
| 11.8 | 12 |
| 9.26 | 79 |
| 6.83 | 89 |
| 5.51 | 28 |
| 4.98 | 36 |
| 4.29 | 100 |
| 3.94 | 12 |
| 3.56 | 12 |
| 3.42 | 42 |
| 2.91 | 85 |
| 2.60 | 7 |
| 2.28 | 7 |
| 2.07 | 10 |
| 1.90 | 7 |
| 1.79 | 11 |
| 1.71 | 9 |

EXAMPLE 2

(a) The ion-exchange properties of as-synthesized LZ-276 prepared in Example 1, supra, with respect to sodium cations were investigated by the following procedure: 3.0 grams of the starting LZ-276 were slurried in an aqueous solution of 2.581 grams of NaCl in 20 mil of deionized water. The slurry was heated to 85° C. and held at approximately that temperature for 1 hour. The zeolite particles were recovered by filtration and washed with water and the entire procedure repeated twice again. The chemical analysis of the product zeolite revealed that there was no measurable increase in its $Na_2O$ content and no measurable decrease in its $(TEA)_2O$ content. The chemical composition of the starting LZ-276 and the product of the attempted ion-exchange with NaCl were found to be, respectively:

0.25$(TEA)_2O$ : 0.73 $Na_2O$ : $Al_2O_3$ : 7.67 $SiO_2$ and 0.25$(TEA)_2O$ : 0.73 $Na_2O$ : $Al_2O_3$ : 7.62 $SiO_2$ (b) The product of the attempted sodium ion-exchange procedure of part (a) of this Example 2 was contacted with $NH_4^+$ ions under ion-exchange conditions by the following method: 2.21 grams of the LZ-276 material were slurried for 1 hour in an aqueous solution of 1.788 grams $NH_4Cl$ in 20 ml. of deionized water heated to 85° C. The solids were recovered by filtration and washed with water. The procedure was repeated two more times and the recovered and washed product was dried in air at ambient room temperature. The ammonium ion-exchange treatment removed all of the sodium content of the zeolite but effected negligible removal of the $TEA^+$ ions as indicated by chemical analysis of the product which showed the chemical composition (anhydrous basis) to be:

0.69 $(NH_4)_2O$ : 0.24 $(TEA)_2O$ : 0.00 $Na_2O$ : $Al_2O_3$ : 7.56 $SiO_2$

EXAMPLE 3 a) Portions of composite A and composite B prepared in Example 1(a) above were tested for thermal stability by calcination in air at 600° C. The same apparatus and general procedure as were used in Example 1(b) were employed using the following heating regimens:
  (i) 100° C.–350° C. in 1 hour, held at 350° C. for 1 hour
  (ii) 350° C.–600° C. in 2 hours, held at 600° C. for 1 hour
  (iii) Cooled to 100° C. and held for 24 hours The x-ray powder diffraction patterns of both samples were obtained. The calcined composite A sample was x-ray amorphous while the calcined composite B sample was fully crystalline. This example demonstrates that the product $SiO_2/Al_2O_3$ ratio is important to stability of LZ-276 when calcining the product to remove the template. Composite A had a $SiO_2/Al_2O_3$ ratio of 5.0 while that of composite B was 7.7.

b) The 600° C. calcined sample of composite B above was contacted with $NH_4^+$ ions using the following procedure: 5.51 gms of the calcined LZ-276 material were slurried for 1 hour in an aqueous solution of 27.56 gm $NH_4Cl$ in 110 ml of deionized water heated to 95° C. The solids were recovered by filtration and washed with water. The procedure was repeated two more times, the product washed with water and dried in air at ambient room temperature. The x-ray powder diffraction pattern of the product is set forth in TABLE F, below:

TABLE F

| d,A | Relative Intensity ($I/I_o \times 100$) |
|---|---|
| 11.7 | 8 |
| 9.28 | 85 |
| 6.84 | 100 |
| 5.50 | 20 |
| 4.97 | 28 |
| 4.28 | 83 |
| 3.94 | 12 |
| 3.54 | 12 |
| 3.42 | 38 |
| 2.90 | 58 |
| 2.58 | 10 |
| 2.07 | 7 |
| 1.90 | 8 |
| 1.79 | 10 |
| 1.71 | 7 |

(c) Portions of the 600° C.-calcined Composites A and B of part (a) of this example and the ammonium-exchanged composition of part (c) hereof, following vacuum activation at 450° C., were analyzed using a standard McBain-Baker apparatus for adsorption properties with respect to oxygen at −183° C. and 100 torr, neopentane at 25° C. and 500 torr, SF$_6$ at 25° C. and 400 torr and water vapor at 25° C. and 4.6 torr. The results are shown below in tabular form.

| Adsorbent | Calcined Composite A | Calcined Composite B | Calcined Composite B NH$_4^+$-Exchanged |
|---|---|---|---|
| O$_2$ | 0.2 wt. % | 21.9 wt. % | 21.0 wt. % |
| C$_4$H$_{12}$ | 0.0 " | — | 0.2 " |
| SF$_6$ | 0.0 | 0.0 | 0.0 |
| H$_2$O | 1.7 " | 20.3 " | 20.6 " |

The adsorptive data for Composite A, which prior to calcination at 600° C. was LZ-276 having a Si/Al$_2$ ratio of 5.0, establish that the calcination rendered the zeolite starting material totally amorphous. This fact is corroborated by the x-ray diffraction analysis. In marked contrast, Composite B, having a Si/Al$_2$ ratio of 7.7, was stable toward calcination at 600° C. as evidenced by its retention of 21.9 wt. % oxygen capacity. Its capacity for oxygen adsorption, moreover, was not appreciably diminished by the post-calcination ammonium ion-exchange treatment.

EXAMPLE 4

LZ-276 was prepared according to the following procedure: using a separatory funnel, 614.4 grams of tetraethylorthosilicate were added over the period of 1.5 hours to 1017.6 grams of a 40% aqueous solution of tetraethylammonium hydroxide (TEAOH). The temperature of the resultant solution was about 30° C. at the completion of the TEAOH addition, and was thereafter raised to 78°–80° C. by the application of external heat, and maintained at that temperature for 4 hours. This first solution was cooled to ambient room temperature. A second solution was prepared by dissolving 3.12 grams of NaOH in 864 ml. of deionized water and then adding and dissolving therein 31.2 grams (anhydrous basis) of sodium aluminate, NaAlO$_2$. After combining the first and second solutions the overall reaction mixture thus formed was aged at ambient room temperature for 84 hours. Two portions of the aged mixture, each weighing 69 grams and identified as samples 4(a) and 4(b), respectively, were then crystallized in sealed reactors at 150° C. for 3 days and 10 days, respectively. A third, 39-gram portion, identified as sample 4(c), was aged at ambient room temperature for an additional period of 300 hours (12.5 days) and then crystallized at 150° C. in a sealed reactor for 31 days. The solid products of the crystallization, weighing 3.1, 5.6 and 2.3 grams, respectively, for the three samples, 4(a), 4(b) and 4(c), were recovered by filtration, washed with distilled water and dried at ambient room temperature. The products were subjected to x-ray and chemical analysis with the following results:

(i) The product of sample 4(a) was found to be well-crystallized LZ-276 having the chemical composition (anhydrous basis) of:

0.19 (TEA)$_2$O : 0.7g Na$_2$O : Al$_2$O$_3$ : 6.71 SiO$_2$ and having the characteristic x-ray diffraction pattern set forth in TABLE G.

TABLE G

| d, | Relative Intensity (I/I$_o$ × 100) |
|---|---|
| 11.8 | 15 |
| 9.28 | 39 |
| 6.86 | 39 |
| 5.51 | 18 |
| 5.01 | 100 |
| 4.29 | 52 |
| 3.96 | 14 |
| 3.57 | 7 |
| 3.43 | 46 |
| 2.91 | 38 |
| 2.59 | 22 |
| 2.28 | 6 |
| 2.12 | 5 |
| 2.08 | 12 |
| 1.90 | 8 |
| 1.80 | 19 |
| 1.71 | 13 |
| 1.69 | 6 |
| 1.67 | 9 |

(ii) The product of sample 4(b) was found to be predominantly zeolite beta containing only a small amount of LZ-276.

(iii) The product of sample 4(c) was found to be predominantly zeolite ZSM-12 containing trace amounts of LZ-276 and zeolite beta.

It is apparent from the data of this Example 4 that crystallization periods of undue length at 150° C. tend to result in the loss of prior-formed LZ-276 and subsequent formation of other zeolite species. The precise mechanism for this serial transition in the character of the product is not fully understood at present.

What is claimed is:

1. Synthetic crystalline aluminosilicate zeolite having, in its as-synthesized form and on an anhydrous basis, a chemical composition expressed in terms of oxide ratios

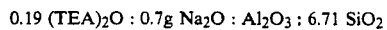

1.0±0.1 [x(TEA)$_2$O+(1−x)Na$_2$O]: Al$_2$O$_3$ : y SiO$_2$ wherein "x" has a value of between about 0.1 and 0.5, "y" has a value of 7.0 to 15 and "TEA" represents the tetraethylammonium cation, said zeolite having in an activated state an adsorptive capacity for SF$_6$ at 25° C. and 400 torr pressure of less than 0.1 weight percent, an adsorptive capacity for oxygen at −183° C. and 100 torr pressure of at least 17 weight percent, and an X-ray powder diffraction pattern essentially as follows:

| d, Å | Relative Intensity |
|---|---|
| 11.6 ± 0.5 | M |
| 9.30 ± 0.2 | S |
| 6.86 ± 0.1 | S |
| 5.54 ± 0.1 | M |
| 5.01 ± 0.1 | S |
| 4.29 ± 0.1 | VS |
| 3.96 ± 0.1 | M |
| 3.56 ± 0.05 | M |
| 3.43 ± 0.05 | S |
| 2.91 ± 0.05 | S |
| 2.59 ± 0.05 | M |
| 2.28 ± 0.05 | W |
| 2.12 ± 0.05 | W |
| 2.08 ± 0.05 | W |
| 1.90 ± 0.05 | W |
| 1.80 ± 0.05 | W |
| 1.71 ± 0.05 | W |
| 1.69 ± 0.05 | W |

| d, Å | Relative Intensity |
|---|---|
| -continued | |
| 1.67 ± 0.05 | W. |

2. Crystalline aluminosilicate zeolite composition according to claim 1 wherein the value of "y" is at least 7.5.

3. Crystalline aluminosilicate zeolite composition prepared by calcining at a temperature of at least 450° C. the as-synthesized zeolite composition of claim 1.

4. Crystalline aluminosilicate zeolite composition according to claim 3 wherein the value of "y" is at least 7.5.

5. Process for preparing a crystalline aluminosilicate of claim 1 which comprises forming a reaction mixture having a composition expressed in terms of mole ratios of oxides within the ranges

| | |
|---|---|
| $Na_2O/SiO_2 =$ | 0.03–0.25 |
| $SiO_2/Al_2O_3 =$ | 4–35 |
| $H_2O/Na_2O =$ | 120–450 |
| $(TEA)_2O/SiO_2 =$ | 0.2–2.0 | wherein "TEA" represents the tetraethylammonium ion, and crystallizing said mixture under autogenous pressure at a temperature of from 125° C. to 150° C. for a period sufficient to form crystals of the said zeolite of claim 1 but less than the period necessary to convert the initially formed zeolite crystals to zeolite beta.

* * * * *